United States Patent [19]
Yokoyama

[11] Patent Number: 5,457,558
[45] Date of Patent: Oct. 10, 1995

[54] OPTICAL WAVEGUIDE MULTIPLEXER FOR OPTICAL FIBER AMPLIFIERS

[75] Inventor: Jun Yokoyama, Tokyo, Japan

[73] Assignee: NEC Corporation, Tokyo, Japan

[21] Appl. No.: 266,580

[22] Filed: Jun. 28, 1994

[30] Foreign Application Priority Data

Jun. 30, 1993 [JP] Japan ................................... 5-161329

[51] Int. Cl.⁶ ...................................................... G02B 6/28
[52] U.S. Cl. .......................... 359/124; 359/127; 359/634
[58] Field of Search ................................... 359/124, 127, 359/129, 629, 634, 638

[56] References Cited

U.S. PATENT DOCUMENTS

| | | | |
|---|---|---|---|
| 4,431,258 | 2/1984 | Fye | 350/1.6 |
| 4,701,012 | 10/1987 | Kaiser | 350/96.19 |
| 5,005,935 | 4/1991 | Kunikane et al. | 350/96.16 |
| 5,067,799 | 11/1991 | Gold et al. | 359/490 |
| 5,299,056 | 3/1994 | Kurata et al. | 359/341 |

FOREIGN PATENT DOCUMENTS

| | | |
|---|---|---|
| 0153722 | 9/1985 | European Pat. Off. . |
| 0164170 | 12/1985 | European Pat. Off. . |
| 0238977 | 9/1987 | European Pat. Off. . |
| 0539021 | 4/1993 | European Pat. Off. . |
| 0571126 | 11/1993 | European Pat. Off. . |
| 3-225304 | 10/1991 | Japan . |

*Primary Examiner*—Mark Hellner

[57] ABSTRACT

An optical waveguide multiplexer for use in optical fiber amplifiers or the like, which is simple in configuration, permits manufacturing at high productivity, and is reduced in size and moreover susceptible to little insertion loss, is to be realized. A multiplexer-branching filter is provided with first to fourth input/output (I/O) terminals. Part of an optical signal emitted from the first I/O terminal is reflected by a branching film, formed over one face of a glass plate, and led to the second optical I/O terminal. The rest of the optical signal penetrates the glass plate, and further penetrates an optical multiplexing film, formed on the other face, to be led to the third optical I/O terminal. The invention has a particular characteristic that the thickness t of the substrate is set so as to satisfy the condition of $t \geq w/\cos\theta \times \tan[\sin^{-1}\{(\sin\theta)/n\}]$ where n is the refractive index of the substrate; w, the beam diameter of the output light of the optical I/O terminal for multiplexing the signal light with an pomping light; and θ, the angle of incidence from this terminal to the substrate. By setting the substrate thickness at or above the value stated above, the optical path of any leak light from the pomping light side is deviated from that toward the monitor side, and no pomping light can enter into the monitor. It is also possible, by adding an aperture film to the substrate, to further reduce the leak light.

16 Claims, 4 Drawing Sheets

OPTICAL WAVEGUIDE MULTIPLEXER FOR OPTICAL FIBER AMPLIFIERS

BACKGROUND OF THE INVENTION

The present invention relates to the configuration of an optical waveguide multiplexer for use in optical fiber amplifiers and the like.

In an optical communication system for long-distance transmission, feeble optical signals attenuated on the transmission path have to be amplified in optical repeaters and receivers arranged on the path. Recently, as means for such amplification, optical fiber amplifiers for directly amplifying optical signals without having to convert them into electric signals are coming into practical use.

Figure 1:
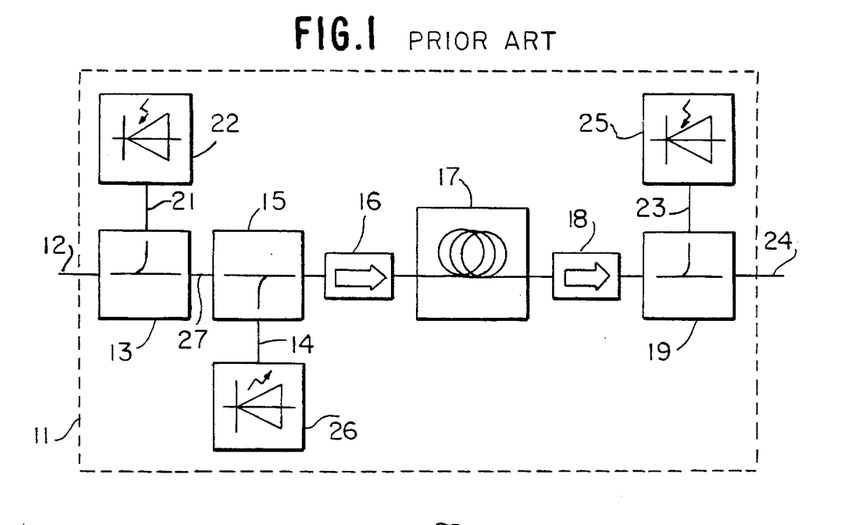
FIG. 1 is a schematic diagram illustrating an optical fiber amplifier to perform branching and multiplexing of light with a branching filter and a waveguide multiplexer according to the prior art.

A typical configuration of such an optical amplifier is illustrated in FIG. 1. An optical fiber amplifier 11 comprises optical isolators 16 and 18, optical branching filters 13 and 19, an optical waveguide multiplexer 15, pumping light source 26, a rare earth ion-doped optical fiber 17 for performing optical amplification, and monitor photodiodes (monitor PD's) 22 and 15. Part of a signal light $P_1$ of wavelength $\lambda_1$, attenuated on the transmission path, is branched into a light $P_2$ by the optical branching filter 13 as monitor light, and entered into the monitor PD 22. The remaining light is transmitted to the optical waveguide multiplexer 15, and multiplexed with a pumping light $P_3$ of wavelength $\lambda_2$, which is supplied from the pumping light source 26, to output a light $P_4$. The light $P_4$ further passes the isolator 16 and is transmitted over the rare earth ion-doped optical fiber 17 for the amplifying purpose. The original signal light $P_1$ is optically amplified into a light $P_5$ to pass the isolator 18. At this time, part of the light $P_5$ is branched by the optical branching filter 19 into a light $P_6$ as monitor light to be entered into the monitor PD 25, and the remaining light $P_7$ is supplied from the optical fiber amplifier 11. Here, the wavelength $\lambda_1$ of the normally transmitted signal light differs from the wavelength $\lambda_2$ of the pumping light. For instance, against a signal light of $\lambda_1=1.55$ μm, at which the transmission loss of the optical fiber is minimized, a pumping light of $\lambda_2=1.48$ μm or 0.98 μm, at which the rare earth ion-doped optical fiber can achieve a large amplification gain, is used.

Any optical fiber amplifier according to the prior art has a configuration in which the optical branching filter for branching part of the entered signal light to a monitor PD and the optical waveguide multiplexer for multiplexing the pumping light from an excited light source are separately provided. Regarding the case in which the optical branching filter and the optical waveguide multiplexer are to be separately provided, the internal configuration of each unit will be described below.

Figure 2:
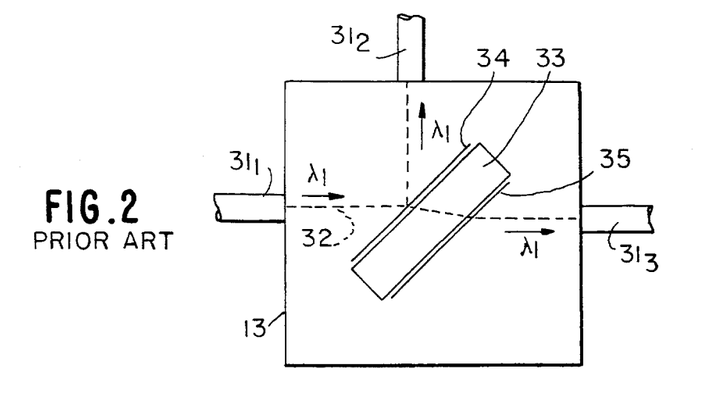
FIG. 2 is a diagram illustrating the principle of the prior art branching filter by way of an example of configuration.

FIG. 2 specifically illustrates the configuration of the first optical branching filter 13 as an example of optical branching filter used in this prior art optical fiber amplifier. Incidentally, the configuration of the second optical branching filter 19 is substantially the same as that of the first optical branching filter 13.

The first optical branching filter 13 is provided with three input/output (I/O) terminals $3_{11}$ to $3_{13}$ including the first I/O terminal $3_{11}$; the second I/O terminal $3_{12}$ arranged in a direction normal to the travelling direction of an optical signal 32 coming incident via the first I/O terminal $3_{11}$; and the third I/O terminal $3_{13}$ arranged in the travelling direction of the optical signal 32 coming incident via the first I/O terminal $3_{11}$. Within the first optical branching filter 13 is arranged a glass plate 33 inclined at a prescribed angle to the travelling direction of the optical signal 32. A branching film 34 is formed on the face where the optical signal 32 comes incident, and an anti-reflection film 35, on the opposite face. In the first optical branching filter 13, when the optical signal 32 of wavelength $\lambda_1$, for instance, comes incident via the I/O terminal $3_{11}$, it is partly branched by the branching film 34, and the branched part is radiated via the second I/O terminal $3_{12}$. The rest of the optical signal penetrates the glass plate 33, and is radiated via the third I/O terminal $3_{13}$.

Figure 3:
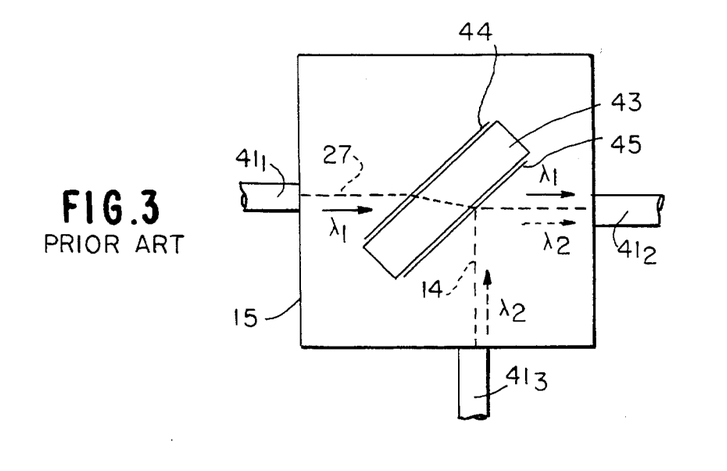
FIG. 3 is a diagram illustrating the principle of the prior art waveguide multiplexer by way of an example of configuration.

FIG. 3 specifically illustrates the configuration of the prior art waveguide multiplexer used in the optical fiber amplifier shown in FIG. 2. The waveguide multiplexer 15 is provided with three I/O terminals $4_{11}$ to $4_{13}$ including the first I/O terminal $4_{11}$; the second I/O terminal $4_{12}$ arranged in the travelling direction of an optical signal 27 coming incident via the first I/O terminal $4_{11}$; and the third I/O terminal $4_{13}$ arranged in a direction normal to the travelling direction of the optical signal 27. Within this waveguide multiplexer 15 is arranged a glass plate 43 inclined at a prescribed angle to the travelling direction of the optical signal 27. An anti-reflection film 44 is formed on the face where the optical signal 27 comes incident, and an optical multiplexing film 45, on the opposite face.

In the optical waveguide multiplexer 15, the optical signal 27 of wavelength $\lambda_1$ comes incident via the first I/O terminal $4_{11}$, and a pumping light 14 of $\lambda_2$ comes incident via the third I/O terminal $4_{13}$. The optical signal 27 penetrates the anti-reflection film 44, the glass plate 43 and the optical multiplexing film 45 successively, and is led to the I/O terminal $4_{12}$. On the other hand, the pumping light 14 is reflected by the optical multiplexing film 45, and similarly led to the I/O terminal $4_{12}$.

In this manner, in the prior art optical fiber amplifier, the first optical branching filter 13 and the waveguide multiplexer 15 are separately arranged as physically different parts on the input side of the rare earth ion-doped fiber 17. As a result, not only is the number of parts increased but also there is the need to adjust the relative positions of the first optical branching filter 13 and the waveguide multiplexer 15. This conventional configuration, in which the optical branching filter and the optical waveguide multiplexer are separately provided, has the disadvantage of an increased overall size due to the large number of parts constituting the optical fiber amplifier. The large number of constituent parts, including altogether six optical I/O terminals being which are required, further creates the problem of a greater manufacturing cost.

There is another disadvantage of a significant loss of signal light because the signal light is collimated to enable it to penetrate the optical branching film in the optical branching filter, and the signal light is again condensed into a parallel beam to let it penetrate the optical multiplexing film. In view of these problems, there has been proposed a multiplexer-branching filter in which the two constituent units are integrated.

Figure 4:
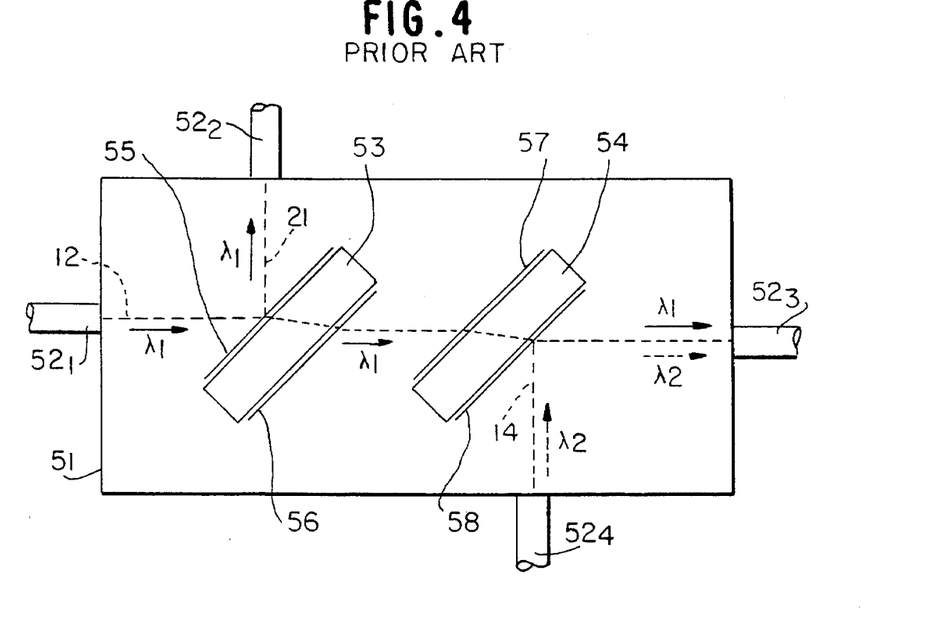
FIG. 4 is a diagram illustrating the principle of a multiplexer-branching filter proposed according to the prior art.

FIG. 4 specifically illustrates the configuration of this proposed multiplexer-branching filter. This multiplexer-branching filter 51 is provided with a total of four I/O terminals $5_{21}$ to $5_{24}$ including the first I/O terminal $5_{21}$; the second I/O terminal $5_{22}$ arranged in a direction normal to the travelling direction of an optical signal 12 of wavelength $\lambda_1$, coming incident via the first I/O terminal $5_{21}$; the third I/O terminal $5_{23}$ arranged in the travelling direction of the optical signal 12; and the fourth I/O terminal $5_{24}$ arranged in a position opposite to the second I/O terminal $5_{22}$.

On the optical path where the first I/O terminal $5_{21}$ and the third I/O terminal $5_{23}$ are coupled in the optical multiplexer-branching filter 51, a first glass plate 53 and a fourth glass plate 54 are arranged at a prescribed interval, both forming the same angle of inclination. A branching film 55 is formed on the incidence face of the first glass plate 53, and an anti-reflection film 56, on the opposite face. An anti-reflection film 57 is formed on the incidence face of the second glass plate 54, and an optical multiplexing film 58, on the opposite face.

In the optical multiplexer-branching filter 51, the optical signal 21 reflected by the branching film 55 of the first glass plate 53 is supplied from the second I/O terminal $5_{22}$ as monitor light. The monitor light is further brought to incidence on the first monitor PD 22 shown in FIG. 2. On the other hand, the optical signal having penetrated the branching film 55, the first glass plate 53 and the anti-reflection film 56 further penetrates the other anti-relfection film 57, the second glass plate 54 and the optical multiplexing film 58. As the pumping light 14 of wavelength $\lambda_2$, coming incident via the fourth I/O terminal $5_{24}$, is reflected by this optical multiplexing film 58, the lights of the two wavelengths $\lambda_1$ and $\lambda_2$ are multiplexed and led to the third I/O terminal $5_{23}$.

As the branching film 55 and the optical multiplexing film 58 are formed on the separate glass plates 53 and 54 in the optical multiplexer-branching filter 51 illustrated in FIG. 4, they cannot be integrated into one and the same constituent part. Therefore, the number of parts is still great, and there is the problem that the size of the multiplexer-branching filter 51 as such is larger than a branching filter or a waveguide multiplexer according to the prior art. There is another problem of the structural complexity of the multiplexer-branching filter 51.

Whereas an optical multiplexer-branching filter of another configuration is disclosed in the Gazette of Patent Disclosure No. 1991-225304, this is an optical element for separating a mixture of lights of two wave-lengths $\lambda_1$ and $\lambda_2$ into its constituent lights, different from a multiplexer-branching filter for performing both branching and multiplexing, and accordingly has no direct relevance to the present invention.

SUMMARY OF THE INVENTION

An object of the invention is to provide a multiplexer-branching filter of simple configuration, which can be reduced in size as well.

An optical multiplexer-branching filter according to the invention comprises a first optical input/output (I/O) terminal for inputting and outputting a light of wavelength $\lambda_1$, and a light transmitting substrate. The substrate has a one face of which is formed an optical branching film which transmits part of the light of wavelength $\lambda_1$, supplied from the first optical I/O terminal, and reflects the rest of the light. The substrate has also another face of which, opposite to the face on which the optical branching film is formed, is formed an optical multiplexing film which transmits the light of wavelength $\lambda_1$ and reflects a light of wavelength $\lambda_2$. The optical multiplexer-branching filter is further provided with a second to a fourth I/O terminal. The second terminal receives the light of wavelength $\lambda_1$ supplied from the first optical I/O terminal and reflected by the optical branching film. The third I/O terminal receives the light of wavelength $\lambda_1$ having penetrated the optical branching film, the substrate and the optical multiplexing film. The fourth I/O terminal is arranged in a position to input a light, reflected by the optical multiplexing film, to the third optical I/O terminal, and supplies the light of wavelength $\lambda_2$.

The optical branching film which reflects part of the light of a first wavelength radiated from the first optical I/O terminal and leads it to the second optical I/O terminal is formed on one face of the light transmitting substrate. The optical multiplexing film which transmits the light having penetrated the optical branching film, leads it to the third optical I/O terminal, reflects the light of a second wavelength radiated from the fourth optical I/O terminal and leads it to the third optical I/O terminal is formed on the other face of said substrate.

Thus, according to the present invention, an optical branching film is formed on one face, and an optical multiplexing film, on the other face of a substrate. A light of a first wavelength is brought to incidence on the light branching face and partly branched, and the rest of the light penetrates the optical branching film and the optical multiplexing film. On the other hand, a light of a second wavelength is brought to incidence on the optical multiplexing film, and multiplexed with the light of the first wavelength having penetrated the optical multiplexing film, and the multiplexed light is radiated.

According to the invention, the first to fourth optical I/O terminals are provided with lens to collimate the input and output lights. The invention is characterized by the condition that the thickness t of the substrate satisfies the following equation:

$$t \geq \frac{w}{\cos\theta \times \tan[\sin^{-1}\{(\sin\theta)/n\}]}$$

where n is the refractive index of the substrate; w, the beam diameter of the light of wavelength $\lambda_2$, supplied from the first optical I/O terminal; and $\theta$, the incident angle of the light from the fourth I/O terminal on the light transmitting substrate.

The invention achieves the size reduction in particular by integrating the functions of an optical branching filter and an optical waveguide multiplexer through the formation of an optical branching film on one, and an optical multiplexing film on the other, face of a light transmitting substrate. The signal light, supplied from the first optical I/O terminal, has only to penetrate a single substrate to have its monitor portion branched and the rest multiplexed with a pumping light. Accordingly, the invention provides the benefit of a smaller loss of the signal light than in the case of any prior art configuration.

Where the optical branching film and the optical multiplexing film are formed on two faces of the single substrate as stated above, the pumping light of wavelength $\lambda_2$, supplied from the optical I/O terminal on the pumping light source side, may not be wholly reflected by but partly penetrate the optical multiplexing film. In such a case, as the penetrating light leaks and is inputted to the optical I/O terminal on the monitor side, arranged in the opposite position with respect to the substrate, part of the feeble signal light which is to be received will become mixed with part of the intense pumping light, and the noise in the monitor light may increase so much as to make adequate monitoring impossible.

The present invention has another feature that, with a view to preventing this problem from arising even though the optical branching filter and the optical waveguide multiplexer are integrated, a substrate of a thickness not less than what is prescribed by the foregoing equation is used.

Thus, by making the substrate thick enough, if any part of the pumping light penetrates the optical branching film, the light having penetrated the substrate would deviate from the optical axis toward the optical I/O terminal on the monitor side.

Still another feature of the invention is the formation of a film, on part of the face on which the optical branching film is formed, to intercept the pumping light. The leak to the monitor side can be further reduced by intercepting the pumping light with this intercepting film.

BRIEF DESCRIPTION OF THE DRAWINGS

The above-mentioned and other objects, features and advantages of the present invention will become more apparent from the following detailed description when taken in conjunction with the accompanying drawings, wherein.

DETAILED DESCRIPTION OF THE PREFERRED EMBODIMENTS

Figure 5:
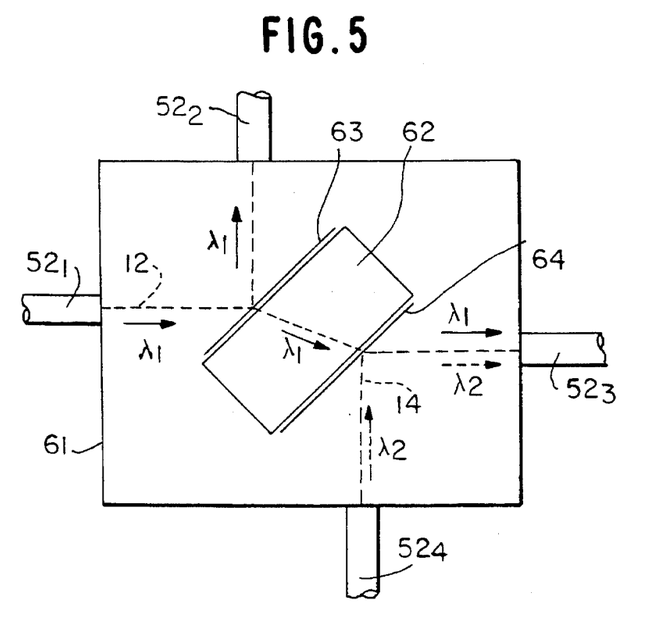
FIG. 5 is a diagram illustrating the principle of the optical waveguide multiplexer in a preferred embodiment of the present invention.

FIG. 5 illustrates the principle of the optical waveguide multiplexer in a preferred embodiment of the present invention. The optical waveguide multiplexer according to the invention, shown in FIG. 5, is applicable to optical amplifiers for optical communication systems of the 1.55 μm band. It has a function to partly branch the input signal light of 1.55 μm in wavelength to a monitor PD and to multiplex the rest of the signal light with a pumping light of 1.48 μm in wavelength. In FIG. 4, the same reference signs are assigned to respectively the same parts as in FIG. 4, and their explanation will be dispensed with where appropriate.

In this optical waveguide multiplexer 61, a substrate 62 is arranged so as to be inclined with respect to a straight line connecting a first I/O terminal $5_{21}$ and a third I/O terminal $5_{23}$. On one face of the substrate 62 on which a first light of wavelength $\lambda_1$ (an optical signal 12) is to come incident, a branching film 63 is vapor-deposited. On the other face on which a second light of wavelength $\lambda_2$ (a pumping light 14) from a second I/O terminal $5_{24}$ is to come incident, an optical multiplexing film 64 is vapor-deposited.

The optical branching film 63, consisting of a multi-layer film of $TiO_2$ and $SiO_2$ vapor-deposited over a substrate 1, has a characteristic to transmit about 90% of the incident light and to reflect the remaining 10%. On the other hand, the optical multiplexing film 64, consisting of a multi-layer film similar to the optical branching film 63, has a characteristic to transmitting a signal light of 1.55 μm in wavelength and to reflect an pumping light of 1.48 μm in wavelength. The substrate 1 is made of BK7 glass as according to the prior art.

Part of the optical signal 12 coming incident on the branching film 63 is led in the direction toward a second I/O terminal $5_{22}$. The remaining part of the optical signal 12 penetrates the branching film 63, the glass substrate 62 and the optical waveguide multiplexer 64, and is led to the third I/O terminal $5_{23}$. The pumping light 14 coming incident from the second I/O terminal $5_{22}$ is reflected by the optical multiplexing film 64, and also led to the third I/O terminal $5_{23}$.

If the multiplexer-branching filter 61 is used, for example, in the optical fiber amplifier shown in FIG. 2, a monitor light to come incident on a first monitor PD 22 is obtained from the second I/O terminal $5_{22}$. From the third I/O terminal $5_{23}$ is radiated a multiplexed light of wavelengths $\lambda_1$ and $\lambda_2$ coming incident on a rare earth ion-added fiber 17 via an optical isolator 16.

In this embodiment, the branching film 63 has a function to branch the optical signal 12 of 1.55 μm in wavelength (wavelength $\lambda_1$) in a 9-to-1 ratio, and the optical multiplexing film 64 has a function to transmit the optical signal 12 of 1.55 μm in wavelength and to reflect the pumping light 14 of 1.48 μm in wavelength (wavelength $\lambda_2$). Therefore, of the optical signal of 1.55 μm in wavelength emitted from the first I/O terminal $5_{22}$, 10% is reflected by the branching film 63 to be led to the second I/O terminal $5_{22}$, and 90% penetrates the branching film 63 to be led to the third I/O terminal $5_{23}$. The excited light 14 of 1.48 μm in wavelength emitted from the fourth I/O terminal is reflected by the optical multiplexing film 64 to be led to the third I/O terminal $5_{23}$.

Each of the first to fourth optical I/O terminals $5_{21}$ to $5_{24}$ is provided, at the tip of an optical fiber terminal formed from the end face of the optical fiber, with an aspheric lens (not shown) for collimating the light radiated from the optical fiber. About 10% of the signal light 12 supplied from the first I/O terminal $5_{21}$ is reflected by the branching film 63. The reflected light is inputted to the second I/O terminal $5_{22}$, and entered into a monitor PD outside the optical waveguide multiplexer 61. The rest of the signal light having penetrated the branching film 63 further penetrates the substrate 62 and the optical multiplexing film 64, is inputted to the third I/O terminal $5_{23}$, and transmitted to an external optical fiber for optical amplification.

On the other hand, the pumping light 14 of 1.48 μm in wavelength from an external pumping light source is supplied via the fourth I/O terminal $5_{24}$, reflected by the multiplexing film 64, and inputted to the third I/O terminal $5_{23}$. It is multiplexed with the signal light 12 supplied from the first I/O terminal $5_{21}$ and transmitted to the optical fiber for optical amplification.

As so far described, the present invention allows a single substrate, consisting of a glass plate or the like, to suffice unlike in any prior art configuration which requires one glass plate each for branching and multiplexing of light, and therefore approximately halves the cubic measure of the multiplexer-branching filter compared with any such apparatus according to the prior art. Moreover, as the relative positioning of two substrates is unnecessary, the positions for optical axis adjustment and fixation are reduced in number, which contributes to productivity improvement. Furthermore, the formation of an optical branching film on one, and of an optical multiplexing film on the other, face of the substrate can help to reduce the number of parts substantially and, accordingly, the costs of manufacturing and the storage of each part.

Next will be described in detail the configuration for improving the performance characteristics of the optical waveguide multiplexer according to the invention. Isolation in the reflection impeding area of the optical multiplexing film 64, formed of a multi-layer film, is usually no more than about 25 dB. Thus, in the above-described embodiment, more than 90% of the excited light 14 of 1.48 μm in wavelength, supplied from the fourth optical I/O terminal $5_{24}$, is reflected by the optical multiplexing film 64. However, the very small proportion, 0.2 to 0.3%, of the pumping light 14 penetrates the optical multiplexing film 64, and is inputted to the second optical I/O terminal $5_{22}$, arranged on the opposite side of the substrate 62. The monitor light, which should be branched from the signal light 12 and inputted to the optical I/O terminal $5_{22}$, is a very feeble light, attenuated in the course of transmission. By contrast, the pumping light 14 leaking from the fourth optical I/O terminal side has a great intensity. Therefore, any part of the pumping light 14, even if only an extremely small proportion, inputted to the second optical I/O terminal $5_{22}$ would make accurate monitoring of the signal light 12 impossible.

To prevent the aforementioned problem from actualizing, the optical waveguide multiplexer 61 according to the invention requires the substrate 62 to be thicker than a certain extent. The path of the light having penetrated the optical multiplexing film 64 is shifted away from that of the signal light which is to be inputted to the second optical I/O terminal $5_{22}$. Here, the separation distance d of the optical path of the shifted excited light 14 from that of the signal 12 to be inputted to the second optical I/O terminal $5_{22}$ is represented by Equation (1):

$$d = 2t \times \cos\theta \times \tan[\sin^{-1}\{(\sin\theta)/n\}] \quad (1)$$

where t is the thickness of the substrate 62; θ, the angle of incidence of the signal light or the excited light on the substrate; and n, the refractive index of the substrate. Supposing that the beam diameter of the signal light 12 and of the pumping light 14 is 0.5 mm; the angle of incidence on the substrate 62, 45 degrees; the refractive index of the substrate 62, 1.5; and the thickness of the substrate 62, 3.0 mm, the separation distance d will be 2.26 mm, sufficient to keep the optical path of the pumping light 14 away from that of the signal light 12.

Figure 6:
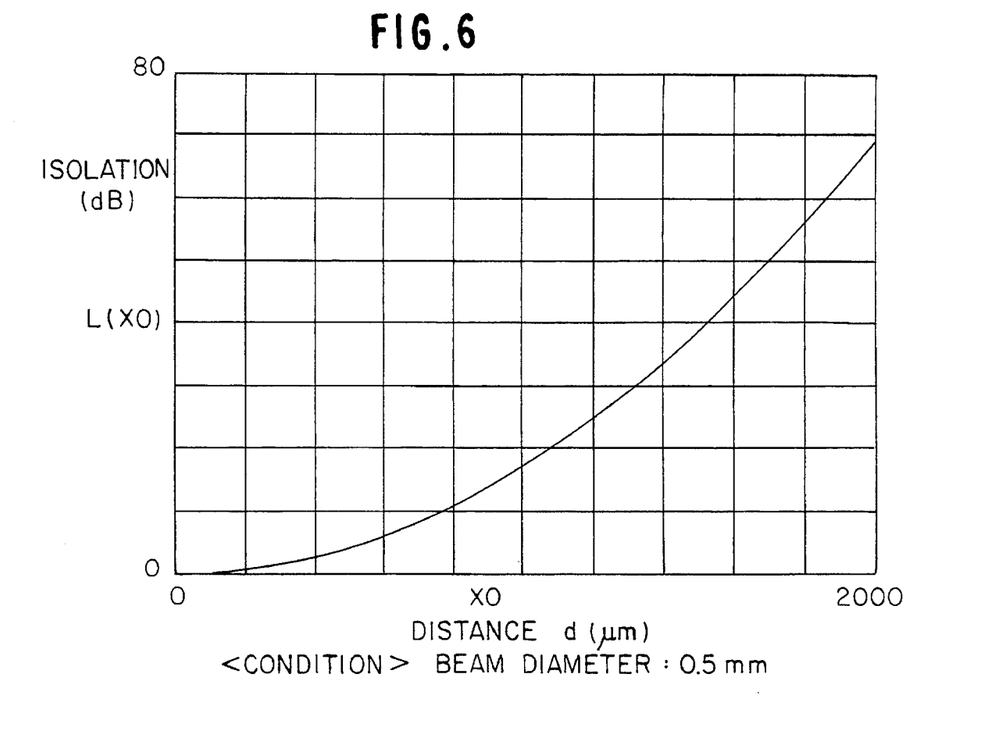
FIG. 6 is a graph illustrating the relationship between the distance of separation and isolation in the optical waveguide multiplexer in the embodiment of the invention.

FIG. 6 illustrates the relationship between the distance of separation from the optical axis toward the second optical I/O terminal $5_{22}$ and the isolation of the light emitted from the fourth optical I/O input terminal $5_{24}$ from that emitted from the first optical I/O terminal $5_{21}$, the beam diameter being supposed to be 0.5 mm. If the separation distance is set at about 2 mm, the isolation will be about 70 dB, resulting in a sufficient reduction of the light leak from the fourth optical I/O terminal $5_{24}$.

It is now supposed that an optical waveguide multiplexer according to the invention having such a configuration is actually produced, and the excited light 14 is supplied from the fourth optical I/O terminal $5_{24}$. It has been confirmed that, in this case, no excited light is detected from the second optical I/O input terminal $5_{22}$ within the limit of measurement sensitivity and that the isolation is 80 dB or more. For instance, if the intensity of the signal light 12 supplied from the first optical I/O input terminal $5_{21}$ is −20 dBm and that of the pumping light 14 supplied from the fourth optical I/O terminal $5_{24}$ is +15 dBm, the intensity of the pumping light leak will be −65 dBm while that of the signal light inputted to the second optical I/O terminal $5_{22}$ will be −30 dBm. Therefore, the pumping light component will have no effect on the monitoring of the signal light 12.

Generally, if the optical path is separated by a distance greater than the diameter of the beam, sufficient isolation can be ensured. Therefore, on the basis of Equation (1), if the thickness t of the substrate 62 is set at a value satisfying Equation (2), the pumping light can be sufficiently prevented from being inputted to the optical I/O terminal on the monitor side.

$$t \geq \frac{w}{\cos\theta \times \tan[\sin^{-1}\{(\sin\theta)/n\}]} \quad (2)$$

Thus, an optical branching film and an optical multiplexing film are formed on two faces of the same substrate, and a light is branched by transmission and reflection on the side where the optical branching film is formed. On the other side where the optical multiplexing film is formed, lights of two different wavelengths are multiplexed. By using this configuration, an optical branching filter and an optical waveguide multiplexer can be integrated, and the cubic measure of the optical amplifier can be reduced to half of the conventional one or even less. Moreover, the signal light radiated from the optical fiber of the first optical I/O terminal is collimated by an aspherical lens, and penetrates the optical branching film and the optical multiplexing film at a time. Compared with the configuration according to the prior art, this reduces the number of times the light has to be collimated or focused and the number of times it penetrates the substrate, resulting in a reduced insertion loss of the multiplexer. Moreover, antireflection films which would be otherwise required on the end faces of the substrate can be dispensed with. Furthermore, the number of optical I/O terminals is reduced from the conventional six to four, resulting in a smaller number of needed parts and a simplified manufacturing process.

At the same time, by using a substrate thicker than a certain extent to deviate the optical path of the leak of the pumping light from that of the signal light toward the monitor side, the pumping light can be prevented from leaking to the monitor side even if the optical branching filter and the optical waveguide multiplexer are integrated, and the signal light is enabled to be monitored without being affected by the pumping light.

Incidentally, although the optical branching film in the above-described embodiment of the present invention is formed of a multi-layer film, its composition need not be limited to this, but grating or some other means may as well be used. The angle of incidence on the optical branching film and the optical multiplexing film is supposed to be 45 degrees, but this angle obviously permits free choice.

Figure 7:
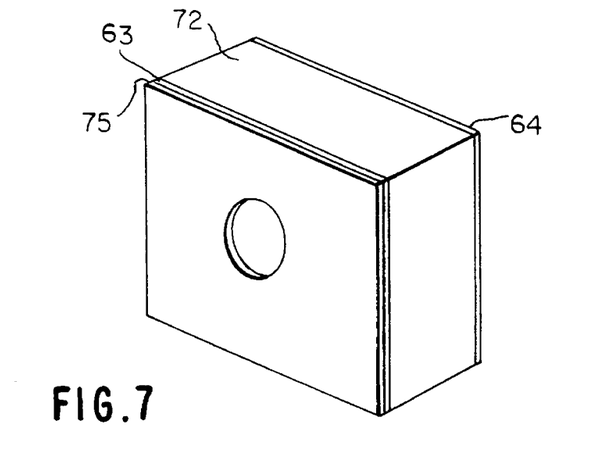
FIG. 7 shows a perspective view of the substrate used in another preferred embodiment of the invention.

Next will be described another preferred embodiment of the invention representing a further improvement of the performance characteristics of the embodiment illustrated in FIG. 5. FIG. 7 shows a perspective view of the substrate used in the improved embodiment of the invention. A substrate 72 shown in FIG. 6, like the substrate 62 in FIG. 5, has the optical branching film 63 formed on its face receiving the light radiated from the first optical I/O terminal $5_{21}$. The substrate 72 further has, in addition to the optical branching film 63, an aperture film 75 consisting of a metal film near the center of which is opened a hole.

The diameter of the hole in the aperture film 75 is about 800 μm, slightly greater than the beam diameter of the light 12 radiated from the first optical I/O terminal $5_{21}$. The light 12 radiated from the first optical I/O terminal $5_{21}$ passes this hole, and part of it penetrates the optical branching film 63. The rest of the light 12 is reflected toward the second optical I/O terminal $5_{22}$. The metal film is formed by vapor-depositing chromium and gold directly on the upper face of the optical branching film 63. The hole of the aperture film 75 is formed by lifting off after the vapor deposition. As the aperture film 75 has a high reflection factor, even if part of the light 12 radiated from the first optical I/O terminal hits the metal film, it will be reflected toward the second optical I/O terminal $5_{22}$, so that there will be no loss of light.

On the other hand, out of the pumping light 14 coming incident from the fourth optical I/O terminal $5_{24}$, a light leak $\lambda_2'$ having penetrated the optical multiplexing film 64 reaches a position away from the position of the hole. Therefore, this leak light $\lambda_2'$ is reflected by the aperture film 75, and accordingly the leak of the pumping light 14 can be prevented from coming incident on the second optical I/O terminal $5_{22}$.

Figures 8, 9, 10:
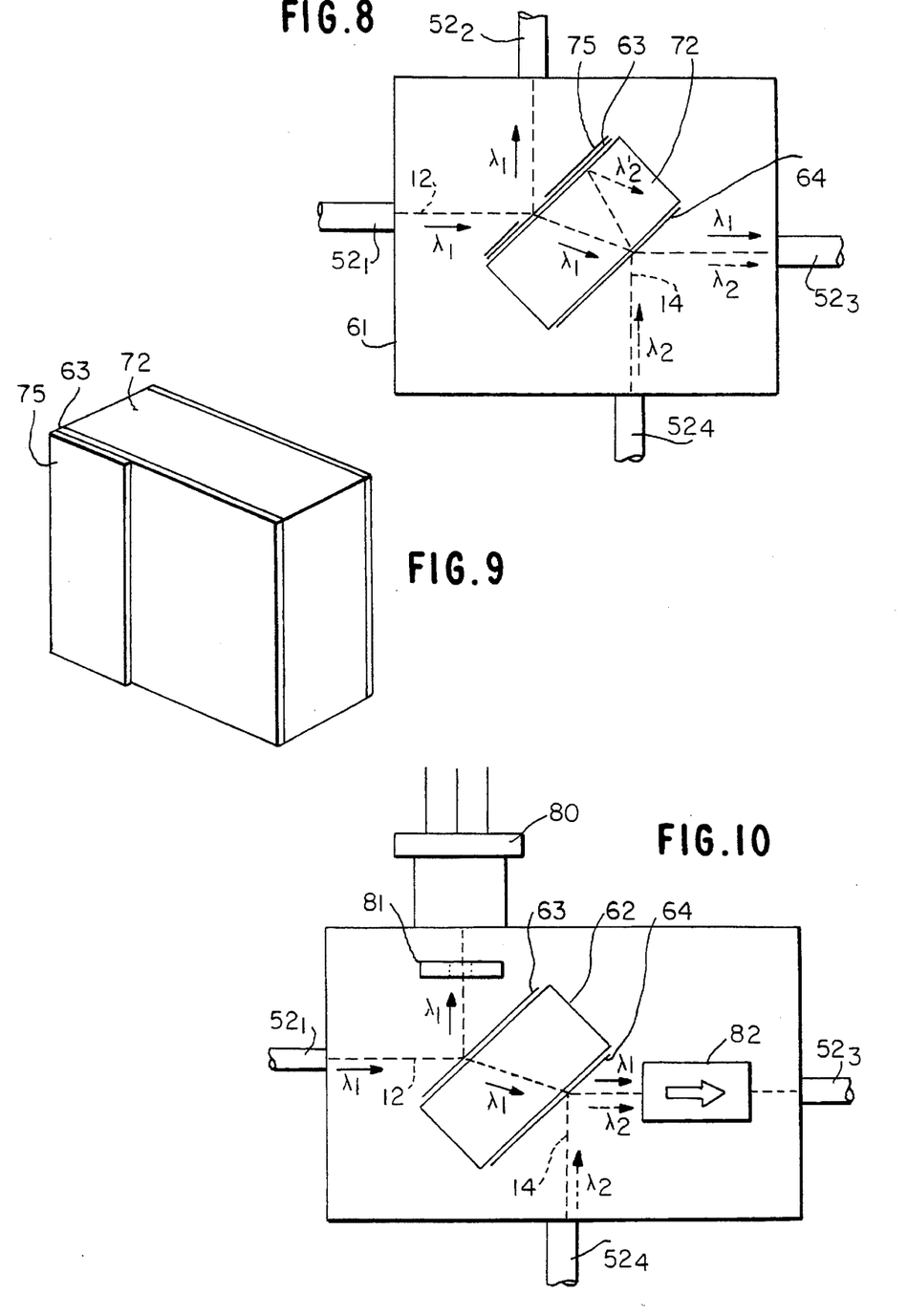
FIG. 8 shows a plan of the configuration of the optical waveguide multiplexer in the other embodiment of the invention.
FIG. 9 shows a perspective view of another configuration of the substrate used in the other embodiment of the invention.
FIG. 10 shows a plan of an optical waveguide multiplexer according to the invention in still another preferred embodiment in which a light receiving element and an isolator are integrated.

Apart from adding the aperture film to the upper face of the optical branching 63, the same effect can be achieved by using a metal aperture film formed, as illustrated in FIG. 9, only in the part beyond the center of the substrate toward the side where the second optical I/O terminal $5_{22}$ is arranged. The aperture film 75 need not be made of metal, but of anything that intercepts light.

Furthermore, as shown in FIG. 10, instead of arranging an optical I/O terminal on the monitor side, a monitor PD 80 may as well be directly arranged without having an optical fiber in-between. In this case, if an aperture film 81 having a hole about equal in diameter to the beam is added in front of the PD, the light leak can be reduced. Furthermore, as illustrated in the same diagram, an isolator 82 can be built into the optical waveguide multiplexer 61. Similarly, it is possible to arrange a pumping light source directly without having an optical fiber in-between, instead of arranging an optical I/O terminal on the pumping light source side.

As hitherto described, the optical multiplexer-branching filter according to the present invention provides the benefits of substantially reducing both the apparatus size and the insertion loss by integrating the optical branching filter and the optical waveguide multiplexer. There are the further benefits of reducing the number of parts, simplifying the manufacturing process and thereby making important contributions to cost saving.

What is claimed is:

1. An optical waveguide multiplexer comprising:
   a substrate having a branching film formed on one face, and an optical multiplexing film formed on the other face;
   a first terminal for supplying a light of a first wavelength to said face of said substrate having said branching film;
   a second terminal for receiving a portion of said light having said first wavelength which is reflected by said branching film, wherein remaining portion of said light having said first wavelength penetrating said branching film, said substrate and said optical multiplexing film, is transmitted to a third terminal; and
   a fourth terminal for supplying light of a second wavelength to said face of said substrate comprising said optical multiplexing film, wherein said second light of said second wavelength reflected by said optical multiplexing film and is transmitted to said third terminal together with said remaining portion of light of said first wavelength.

2. An optical waveguide multiplexer, as claimed in claim 1, wherein said substrate is a single transparent glass plate having a sufficient thickness relative to the beam it transmits.

3. An optical waveguide multiplexer comprising:
   a first optical input/output (I/O) terminal for receiving a light of wavelength $\lambda_1$;
   a light transmitting substrate on one face of which is formed an optical branching film for transmitting part of the light of wavelength $\lambda_1$, supplied from said first optical I/O terminal, and reflecting the rest of the light of wavelength $\lambda_1$, and on another face of which, opposite to the face on which said optical branching film is formed, is formed an optical multiplexing film for transmitting said light of wavelength $\lambda_1$ and for reflecting a light of wavelength $\lambda_2$;
   a second I/O terminal to which is supplied the light of wavelength $\lambda_1$ supplied from said first optical I/O terminal and reflected by said optical branching film;
   a third I/O terminal to which is supplied the light of wavelength $\lambda_1$ having penetrated said optical branching film, said substrate and said optical multiplexing film; and
   a fourth I/O terminal, which is arranged in a position to input said light of wavelength $\lambda_2$, which is reflected by said optical multiplexing film, to said third optical I/O terminal.

4. An optical waveguide multiplexer, as claimed in claim 3, wherein each of said first optical I/O terminal, said second optical I/O terminal, said third optical I/O terminal, and said fourth optical I/O terminal is provided, at its radiating end, with a condenser lens for collimating the radiated light.

5. An optical waveguide multiplexer, as claimed in claim 4, wherein a thickness t of said light transmitting substrate satisfies the equation:

$$t \geq \frac{w}{\cos\theta \times \tan[\sin^{-1}\{(\sin\theta)/n\}]}$$

where n is the refractive index of said light transmitting substrate; w, the beam diameter of the output light of the fourth optical I/O terminal; and Θ, the incident angle of the light from said fourth I/O terminal and said substrate.

6. An optical waveguide multiplexer comprising:
   a first optical input/output (I/O) terminal for receiving a light of wavelength $\lambda_1$;
   a light transmitting substrate on one face of which is formed an optical branching film for transmitting part of the light of wavelength $\lambda_1$, supplied from said first optical I/O terminal, and for reflecting the rest of the light, and on another face of which, opposite to the face on which said optical branching film is formed, is formed an optical multiplexing film for transmitting said light of wavelength $\lambda_1$ and for reflecting a light of wavelength $\lambda_2$;
   a light receiving element, to which is supplied the light of wavelength $\lambda_1$ supplied from said first optical I/O terminal and reflected by said optical branching film, for converting said light of wavelength $\lambda_1$ into an electric signal;

a third I/O terminal to which is supplied the light of wavelength $\lambda_1$ having penetrated said optical branching film, said substrate and said optical multiplexing film; and a fourth I/O terminal, which is arranged in a position to input said light of wavelength $\lambda_2$, which is reflected by said optical multiplexing film, to said third optical I/O terminal.

7. An optical waveguide multiplexer as claimed in claim 6, wherein each of said first optical I/O terminal, said third optical I/O terminal, and said fourth optical I/O terminal is provided, at its radiating end, with a condenser lens for collimating the radiated light, and said light receiving element is provided with a condenser lens in front of its light receiving face.

8. An optical waveguide multiplexer, as claimed in claim 7, wherein a thickness t of said light transmitting substrate satisfies the equation:

$$t \geq \frac{w}{\cos\theta \times \tan[\sin^{-1}\{(\sin\theta)/n\}]}$$

where n is the refractive index of said substrate; w, the beam diameter of the output light of the fourth optical I/O terminal; and θ, the incident angle of the light from said fourth I/O terminal on said light transmitting substrate.

9. An optical waveguide multiplexer, as claimed in claim 4, wherein said light transmitting substrate has, on part of the face on which said optical branching film is formed, a film to intercept or reflect light.

10. An optical waveguide multiplexer, as claimed in claim 7, wherein said light transmitting substrate has, on part of the face on which said optical branching film is formed, a film to intercept or reflect light.

11. An optical waveguide multiplexer, as claimed in claim 9, wherein said film has, in the position where the light radiated from said first optical I/O terminal is incident, a hole whose diameter is substantially equal to a beam diameter of the light radiated from said first optical I/O terminal.

12. An optical waveguide multiplexer, as claimed in claim 10, wherein said film has, in the position where the light radiated from said first optical I/O terminal is incident, a hole whose diameter is substantially equal to the beam diameter of the light radiated from said first optical I//O terminal.

13. An optical waveguide multiplexer, as claimed in claim 9, wherein said film is formed approximately in a half area arranged toward said second I/O terminal beyond the center which is the position where the light radiated from said first optical I/O terminal is incident.

14. An optical waveguide multiplexer, as claimed in claim 10, wherein said film is formed approximately in a half area toward said second I/O terminal beyond the center which is the position where the light radiated from said first optical I/O terminal is incident.

15. An optical waveguide multiplexer, as claimed in claim 3, wherein an isolator is arranged between said light transmitting substrate and said third I/O terminal.

16. An optical waveguide multiplexer, as claimed in claim 6, wherein an isolator is arranged between said light transmitting substrate and said third I/O terminal.

* * * * *

UNITED STATES PATENT AND TRADEMARK OFFICE
CERTIFICATE OF CORRECTION

PATENT NO. : 5,457,558
DATED : October 10, 1995
INVENTOR(S) : Jun YOKOYAMA

It is certified that error(s) appears in the above-identified patent and that said Letters Patent is hereby corrected as shown below:

Abstract, lines 14 & 15, delete "sin-$_1$" and insert --sin$^{-1}$--;
line 17, delete "pomping" and insert --pumping--;
line 21, delete "pomping" and insert --pumping--;
line 22, delete "pomping" and insert --pumping--.

Column 1, line 62, delete "$3_{11}$ to $3_{13}$" and insert --$31_1$ to $31_3$--;
line 63, delete "$3_{11}$" and insert --$31_1$--;
line 63, delete "$3_{12}$" and insert --$31_2$--;
line 65, delete "$3_{11}$" and insert --$31_1$--;
line 66, delete "$3_{13}$" and insert --$31_3$--.

Column 2, line 1, delete "$3_{11}$" and insert --$31_1$--;
line 8, delete "$3_{11}$" and insert --$31_1$--;
line 10, delete "$3_{12}$" and insert --$31_2$--;
line 11, delete "$3_{13}$" and insert --$31_3$--;
line 15, delete "$4_{11}$ to $4_{13}$" and insert --$41_1$ to $41_3$--;
line 16, delete "$4_{11}$" and insert --$41_1$--;
line 16, delete "$4_{12}$" and insert --$41_2$--;
line 18, delete "$4_{11}$" and insert --$41_1$--; delete "$4_{13}$" and insert --$41_3$--;
line 28, delete "$4_{11}$" and insert --$41_1$--;
line 29, delete "$4_{13}$" and insert --$41_3$--;
line 32, delete "$4_{12}$" and insert --$41_2$--;
line 34, delete "$4_{12}$" and insert --$41_2$--;

UNITED STATES PATENT AND TRADEMARK OFFICE
CERTIFICATE OF CORRECTION

PATENT NO. : 5,457,558
DATED : October 10, 1995
INVENTOR(S) : Jun YOKOYAMA

It is certified that error appears in the above-indentified patent and that said Letters Patent is hereby corrected as shown below:

Column 2, line 62, delete "$5_{21}$ to $5_{24}$" and insert --$52_1$ to $52_4$--; delete "$5_{21}$" and insert --$52_1$--;

line 63, delete "$5_{22}$" and insert --$52_2$--;
line 65, delete "$5_{21}$" and insert --$52_1$--;
line 66, delete "$5_{23}$" and insert --$52_3$--;
line 67, delete "$5_{24}$" and insert --$52_4$--.

Column 3, line 1, delete "$5_{22}$" and insert --$52_2$--;
line 2, delete "$5_{21}$" and insert --$52_1$--;
line 3, delete "$5_{23}$" and insert --$52_3$--;
line 14, delete "$5_{22}$" and insert --$52_2$--;
line 22, delete "$5_{24}$" and insert --$52_4$--;
line 24, delete "$5_{23}$" and insert --$52_3$--.

Column 5, line 66, delete "$5_{21}$" and insert --$52_1$--;
line 67, delete "$5_{23}$" and insert --$52_3$--.

UNITED STATES PATENT AND TRADEMARK OFFICE
CERTIFICATE OF CORRECTION

PATENT NO. : 5,457,558
DATED : October 10, 1995
INVENTOR(S) : Jun YOKOYAMA

It is certified that error appears in the above-indentified patent and that said Letters Patent is hereby corrected as shown below:

Column 6, line 4, delete "$5_{24}$" and insert --$52_4$--;
line 18, delete "$5_{22}$" and insert --$52_2$--;
line 21, delete "$5_{23}$" and insert --$52_3$--;
line 22, delete "$5_{22}$" and insert --$52_2$--;
line 24, delete "$5_{23}$" and insert --$52_3$--;
line 28, delete "$5_{22}$" and insert --$52_2$--; delete "$5_{23}$" and insert --$52_3$--;
line 39, delete "$5_{22}$" and insert --$52_2$--;
line 40, delete "$5_{22}$" and insert --$52_2$--;
line 42, delete "$5_{23}$" and insert --$52_3$--;
line 45, delete "$5_{23}$" and insert --$52_3$--;
line 46, delete "$5_{21}$ to $5_{24}$" and insert --$52_1$ to $52_4$--;
line 51, delete "$5_{21}$" and insert --$52_1$--;
line 54, delete "$5_{22}$" and insert --$52_2$--;
line 57, delete "$5_{23}$" and insert --$52_3$--;
line 62, delete "$5_{24}$" and insert --$52_4$--;
line 64, delete "$5_{23}$" and insert --$52_3$--;
line 65, delete "$5_{21}$" and insert --$52_1$--.

UNITED STATES PATENT AND TRADEMARK OFFICE
CERTIFICATE OF CORRECTION

PATENT NO. : 5,457,558
DATED : October 10, 1995
INVENTOR(S) : Jun YOKOYAMA

It is certified that error appears in the above-indentified patent and that said Letters Patent is hereby corrected as shown below:

Column 7, line 23, delete "$5_{24}$" and insert --$52_4$--;
line 26, delete "$5_{22}$" and insert --$52_2$--;
line 29, delete "$5_{22}$" and insert --$52_2$--;
line 34, delete "$5_{22}$" and insert --$52_2$--;
line 42, delete "$5_{22}$" and insert --$52_2$--;
line 44, delete "$5_{22}$" and insert --$52_2$--;
line 61, delete "$5_{22}$" and insert --$52_2$--;
line 62, delete "$5_{24}$" and insert --$52_4$--;
line 63, delete "$5_{21}$" and insert --$52_1$--;
line 67, delete "$5_{24}$" and insert --$52_4$--.

Column 8, line 4, delete "$5_{24}$" and insert --$52_4$--;
line 6, delete "$5_{22}$" and insert --$52_2$--;
line 9, delete "$5_{21}$" and insert --$52_1$--;
line 11, delete "$5_{24}$" and insert --$52_4$--;
line 13, delete "$5_{22}$" and insert --$52_2$--.

UNITED STATES PATENT AND TRADEMARK OFFICE
CERTIFICATE OF CORRECTION

PATENT NO. : 5,457,558
DATED : October 10, 1995
INVENTOR(S) : Jun YOKOYAMA

It is certified that error appears in the above-indentified patent and that said Letters Patent is hereby corrected as shown below:

Column 9, line 6, delete "$5_{21}$" and insert --$52_1$--;
line 11, delete "$5_{21}$" and insert --$52_1$--;
line 12, delete "$5_{21}$" and insert --$52_1$--;
line 15, delete "$5_{22}$" and insert --$52_2$--;
line 21, delete "$5_{22}$" and insert --$52_2$--;
line 23, delete "$5_{24}$" and insert --$52_4$--;
line 29, delete "$5_{22}$" and insert --$52_2$--;
line 34, delete "$5_{22}$" and insert --$52_2$--.

Signed and Sealed this

Eighth Day of October, 1996

*Attest:*

BRUCE LEHMAN

*Attesting Officer*    *Commissioner of Patents and Trademarks*